United States Patent [19]
Gelissen

[11] Patent Number: 5,854,927
[45] Date of Patent: Dec. 29, 1998

[54] MULTIMEDIA SYSTEM RECEPTIVE FOR PRESENTATION OF MASS DATA COMPRISING AN APPLICATION PROGRAM INCLUSIVE OF A MULTIPLATFORM INTERPRETER, AND A PLATFORM SUBSYSTEM ARRANGED FOR INTERACTION WITH SAID MULTIPLATFORM INTERPRETER AND MASS MEMORY FOR USE WITH SUCH SYSTEMS

[75] Inventor: Johan H. A. Gelissen, Eindhoven, Netherlands

[73] Assignee: U.S. Philips Corporation, New York, N.Y.

[21] Appl. No.: 533,030

[22] Filed: Sep. 25, 1995

[30] Foreign Application Priority Data

Sep. 30, 1994 [EP] European Pat. Off. .............. 94202839
Oct. 13, 1994 [EP] European Pat. Off. .............. 94202961

[51] Int. Cl.⁶ ...................................................... G06F 9/44
[52] U.S. Cl. .............................................................. 395/705
[58] Field of Search ............................................. 395/705

[56] References Cited

U.S. PATENT DOCUMENTS

| | | | |
|---|---|---|---|
| 4,667,290 | 5/1987 | Goss et al. ............................. | 395/707 |
| 4,807,224 | 2/1989 | Naron et al. ............................ | 370/218 |
| 4,905,560 | 3/1990 | Bourne .................................... | 395/707 |
| 4,931,950 | 6/1990 | Isle et al. ................................. | 395/806 |
| 5,329,619 | 7/1994 | Page et al. ............................... | 395/615 |
| 5,339,419 | 8/1994 | Chan et al. .............................. | 395/707 |
| 5,339,434 | 8/1994 | Rusis .................................. | 395/200.76 |
| 5,488,714 | 1/1996 | Skidmore ................................ | 395/500 |
| 5,517,636 | 5/1996 | DeHart et al. .......................... | 395/831 |
| 5,586,323 | 12/1996 | Koizumi et al. ....................... | 395/705 |
| 5,592,640 | 1/1997 | Minoura et al. ........................ | 395/428 |
| 5,598,560 | 1/1997 | Benson .................................... | 395/707 |

*Primary Examiner*—Emanuel Todd Voeltz
*Assistant Examiner*—John Q. Chavis

[57] ABSTRACT

A multimedia system comprises an application program title that also comprises a multiplatform interpreter. The application program contains both the application described in a scripting language and the multi-media data. A platform subsystem interacts with the application program title and accesses the application program and interpreter. It executes the application program under control of user input means. Also a user display and an audio subsystem are controlled by the application program. The application program is based on an instruction set that is interpreted by the processing means, using the multiplatform interpreter. The platform is an instance of a prespecified abstract machine with predefined instruction set, data type set, and resource facilities according to quantitative minimum requirements.

16 Claims, 3 Drawing Sheets

MULTIMEDIA SYSTEM RECEPTIVE FOR PRESENTATION OF MASS DATA COMPRISING AN APPLICATION PROGRAM INCLUSIVE OF A MULTIPLATFORM INTERPRETER, AND A PLATFORM SUBSYSTEM ARRANGED FOR INTERACTION WITH SAID MULTIPLATFORM INTERPRETER AND MASS MEMORY FOR USE WITH SUCH SYSTEMS

FIELD OF THE INVENTION

The invention relates to a multimedia system receptive for mass data presentation thereto, said data comprising an application program inclusive of a multiplatform interpreter, said system furthermore having a platform subsystem, arranged for interaction with said multiplatform interpreter, comprising processing means for executing said multiplatform interpreter driven by said application program and under control of user input means, and furthermore having user output means controllable by said multiplatform interpreter. The mass data may be physically present on a self-contained mass memory, such as an optical disc. Alternatively, it may be presented via a remote interconnection or channel in a dialog structure. Multimedia means that the subsystem may receive, process and output more than one category of signal, such categories being for example: alphanumerical text, graphics, speech, music, and possibly other. The subject of the application program, or application for short, may be various as well, such as a video game, an instructive or informative item such as an encyclopedia, a shell for a personalized filing system, or other. Various such platforms have been commercialized, such as CD-I machines and personal computers. Regarding CD-I standards and Compact Disc standards in general, reference is had to the article 'Compact Disc Standards' by Jan Korst and Verus Pronk, ACM/Springer Multmedia Systems, Vol. 2, No. 4, pp. 157–171 (1994), which article is a review of various earlier published specifications of such standards.

The application program is conventionally being called a title, and various such titles have been provided by the manufacturers of the subsystem hardware or by others, in such a way that the titles may be played on a particular type or brand of subsystem, but not on another: they are thus platform-specific. A need has been felt to allow such application programs a potentially larger customer base, in that they would be playable on various different types of platform.

SUMMARY TO THE INVENTION

Accordingly, amongst other things, it is an object of the present invention to make the application program less platform specific, in that an appreciable part of its stored information would have harmonized data formats and be interpretable on various different platform subsystems. The inventors have found it feasible to make programs interpretable on different platforms, in particular, by defining formats for multimedia data that can be played by most platforms, although under certain circumstances it may require some real-time conversion by the delivery platform. Furthermore, even if the bulk of the multimedia data is present in the title only once, it may prove advantageous to have some of the data in platform specific formats. An additional object of the invention is the decoupling of creation platform and playback platforms. Now, according to one of its aspects, the invention is characterized in that said application program is based on a predetermined instruction set that is interpreted by said processing means for said executing, whereby said platform subsystem is an instance of a prespecified abstract machine having said predetermined instruction set, a predetermined data type set, and furthermore comprising resource facilities according to quantitative minimum requirements. In particular, multiplatform multimedia title creation is intended for platform-independent multimedia titles. In the above, an instance is the actual representative or realization of its species; each instance has the minimum facilities of the species, but various instances may differ appreciably.

The invention also relates to a self-contained mass memory comprising a multiplatform interpreter, for use with a system, and comprising:

a dispatch table (A) comprising location addresses of platform dependent primitives, a kernel area (B) containing all locations addressable by said location addresses for storing executable and interpretable code, and an extended kernel area (C+D), having a first area (C) containing code that is both platform independent and title independent and a second area (D) containing title dependent code.

This arrangement of elements has proven to be straightforward, easily accessible, and little prone to definition errors.

The invention also relates to a platform subsystem arranged for interaction with such mass data comprising such title and having load means for loading said multiplatform interpreter. Various further advantageous aspects are recited in dependent claims.

BRIEF DESCRIPTION OF THE DRAWING

These and other aspects and advantages will be described more in detail with reference to the disclosure of preferred embodiments hereinafter, and in particular with reference to the appended drawings, wherein.

Tables 1 to 8 give various exemplary program modules.

DETAILED DESCRIPTION OF PREFERRED EMBODIMENTS

Figure 1:
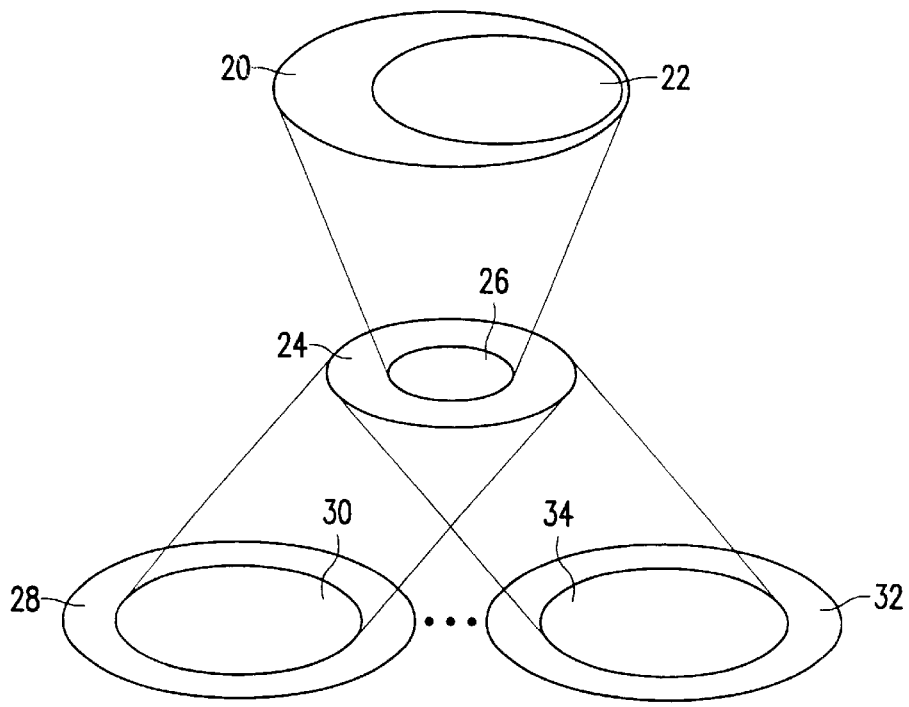
FIG. 1 is an illustration of the functional position of various program types.

FIG. 1 is an illustration of the functional position of various program types for use in a preferred embodiment of the invention. The object of the invention, formulated in a different manner, is to attain a so-called Common Publishing Format, so that published titles need to adhere only to minimal constraints to allow them being played on different platform subsystems or hardware machines. The various so-called assets, for example pictures, sound, structures, character font, and others, represented in the predetermined multi-media formats and processor-independent program code together form a title. The invention obviates the need for storing on a single mass memory all materials separately for each different envisaged platform. The assets of a title are the elements that a human user may come to see or hear. The program code is interpretable on platform subsystems that comply with certain requirements. The code consists of short-format instructions or tokens that each have clear semantics. The language in which these are written is called CPF-Script, which has been disclosed in the report on the OSMOSE Project, ESPRIT project 6788, public version 1.0, Copyright Philips Electronics N.V., The Netherlands, 1994. Some of these tokens will cause audio-visual side effects that consume relatively much time as compared to the execution of the processing, in particular, because of the relative slowness of human perception and expression, as compared to the high processing speeds in computers and related hardware. For specifying all requirements, a so-called "abstract machine" has been defined. Such an abstract machine has a predetermined instruction set, a predetermined data type set, and has resource facilities meeting quantitative minimum requirements. Any real machine or platform that has at least these facilities may now execute the title in question. Such facilities can be expressed in terms like operating speed, memory capacity, I/O (display, sound), operating system features, coprocessing, and many others. Now in FIG. 1, circle 20 symbolizes all programs that translate into CPF-Script (the size of the circle being totally unrelated to the number and size of these programs). The actual writing of these programs can be done through the use of an authoring language that makes life more easy for authors of the programs in CPF-Script, at a price of a slightly narrowed functionality: the resulting programs are represented by circle 22. Compilation and conformation of the programs in circle 20 render them in circle 26 that contains all possible CPF Script programs that can be executed by the Abstract CPF Machine. Circle 24 therearound symbolizes all programs which could possibly be executed by this machine, without the constraint that the program would have to be in CPF-Script. The circle pairs 28/30 and 32/34 now are associated with two arbitrary, different platform subsystems. The inner circles 30, 34 represent a mapping from circle 24. The outer circles 28, 32 symbolize the set of all executable programs that outside the inner circle would not be executable by the abstract machine. Again, the diameters of the various circles as shown are perfectly arbitrary. Moreover, although the contents of the inner circles for various platform subsystems are identical, the content of the outer circles need not be so.

The main goal of the invention is to allow the title developer to abstract from real or physical platforms, which is effected through the introduction of the abstract machine. This abstract machine defines the minimum resource requirements in terms of, for example, audio and video outputting capability, CD-ROM/XA interfaceability, cf. the Korst et al. reference, timer facilities, user input mechanisms, its instruction set, data types to be supported, as well as the minimum behaviour of such platform subsystem when executing a program. A real platform should be able to playback a so-called CPF-Script program through implementation of the instruction set of the abstract machine. The distinction between correct and incorrect programs in CPF-Script is made through applying a conformance test to such program. For the same reason, there is a validation test provided for hardware developers, for discriminating between correct and incorrect platforms: the test here is whether the platform's capabilities are sufficient. A pragmatic realization of such a validation test is the provision of a set of suitable programs, and to test for playability or otherwise on the platform in question.

Figure 2:
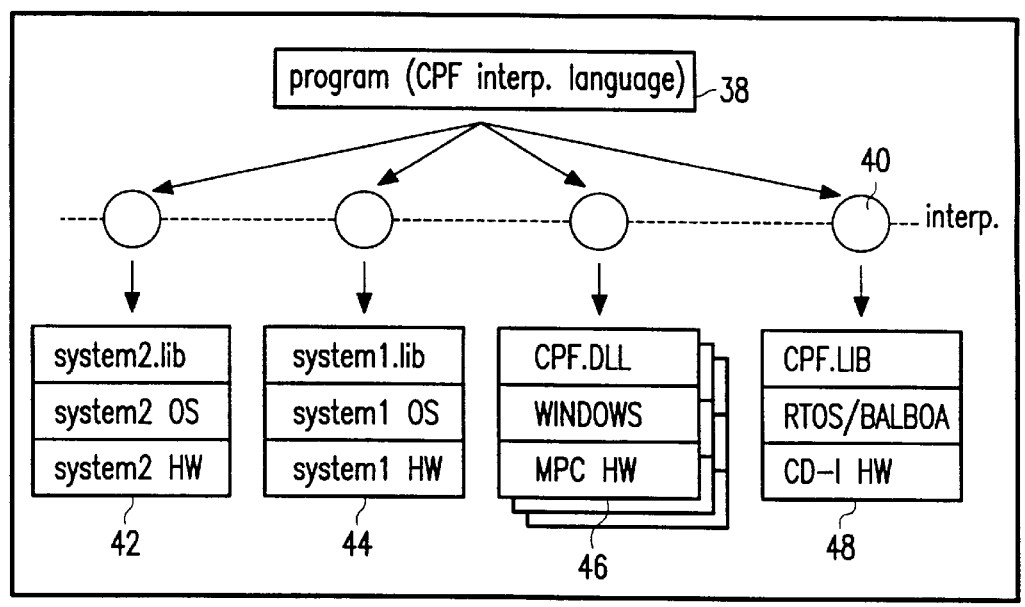
FIG. 2 is an illustration of the interpreter approach.

FIG. 2 is an illustration of the interpreter approach. The approach taken by the present invention is to harmonize data formats and make programs interpretable on different platforms. Generally, it is possible to define multimedia data formats that can be played by most platforms, although it may require some real-time conversion by the delivery platform. Some data may still have to be presented in two or more data formats. Furthermore, the actual application program should be in a high-level representation and then interpreted by the delivery platform. A few special functionalities, such as pertaining to utilities (using or being used by those utilities) specific to the particular platform may have to be coded in a manner that is specific for the platvorm in question. In the setup of FIG. 2, block 38 symbolizes the CPF program. Level 40 shows one specific kernel interpreter for each delivery platform. These kernels 40 translate the CPF-program (for each platform the same program) into platform-independent interface calls. The implementing thereof makes up the CPF abstract machine.

Next to platform-independent CPF-titles, each platform type may have one or more titles that are specific for that particular platform. The advantage for some of these platforms may be due to their dedicated or specific hardware. Therefore, to obtain platform independence, the programs abstract from low-level system functionality. This means that to a certain extent the CPF functionality may be somewhat less than that of the respective platforms taken by themselves. The output of interpreters 40 is presented to the appropriate one of columns 42 . . . 48, that each represent a different platform, in particular, a personal computer 46, and a CD-I player 48. In its realization, the platform in question has a library (CPF.DLL, CPF.LIB), an operating system (Microsoft WINDOWS, CD-RTOS: Compact Disc Real-Time Operating System, derived by Microware, Des Moines, Iowa, U.S.A.) and appropriate hardware (multimedia PC hardware, CD-I hardware). In the above, DLL is the Dynamic Link Library under Windows, LIB is the CD.RTOS Library. For the platforms 42, 44 at left, the sequences among the various subsystems are corresponding.

Figure 3:
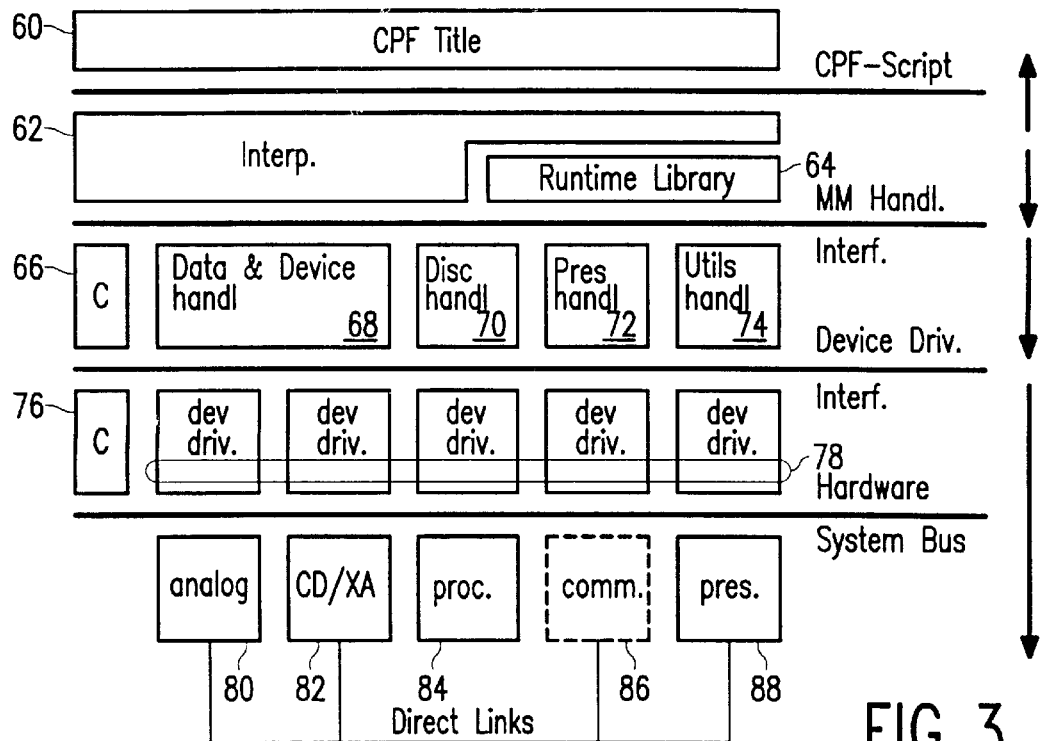
FIG. 3 shows the CPF delivery platform.

FIG. 3 shows the CPF delivery platform with the application program loaded and operational. Each configuration passes to the next higher level of the diagram the current platform capabilities available at the handler level. Level 60 contains the application program itself, which is portable not only between identical instances of the abstract machine, but also between non-identical ones as has been discussed with respect to FIG. 2. The program or title has been formulated in CPF-Script, and as such, layer 60 is an abstraction of the physical disc. The next level contains the interpreter 62 and runtime library 64 that are platform specific. Viz à viz the next lower level they have a multimedia handler interface. The next lower level contains a set of handlers 68 through 74, and a small configuration function for passing the effective organization present within the level in question to the next higher level. The setup of the handlers is configuration specific, and as shown by way of example, there is a data and device handler 68, a disc handler 72, a presentation handler 72 for interacting with audio and/or video display, and a utilities handler 74. In the present context, these utilities may be realized by further facilities, such as graphical input mechanisms. Viz à viz the next lower level the handlers have a device driver interface. As is conventional by itself, such handlers each comprise one or more software modules, that receive as input various general purpose control statements, and translate these in respective sequences of expressions that on the level of the associated device define elementary operations. Viz à viz the next lower level, the handlers have an interface to the device driver. The next lower level itself has device drivers 78, and a configuration function 76 for passing the organizing within that level to the next higher level. The drivers, as is conventional by itself, each are responsive to the expressions generated by the next higher level, and translate these into actions on the device, as determined by the electromechanical, electronic, and possibly further dimensioning of the device in question. Viz à viz the next lower level, the hardware platform comprises a hardware system bus. By way of non-limiting example, various devices have been indicated on the next lower level, to wit, an analog device 80, that allows interaction with user interface devices like pointing devices, a CD-ROM/XA device 82 that has been defined in the Korst et al. reference, supra, and allows for the loading of the assets, and possibly application from the loaded CD-ROM to allow real-time playback of the title in question, a general purpose processing device 84, that executes various functions, such as database or signal processing, a (tele)-communication device 86 that may be used for receiving the mass data, instead of from a locally presented unitary memory medium such as an optical disc, via a telecommunication channel as thereto fed in a remote site. Such data may then be presented autonomously or on demand by the platform subsystem or subdevice. A final element is a presentation device 88, such as an audio device, a video display or a subsystem thereof. The devices as shown may be interconnected by direct physical links.

Figure 4:
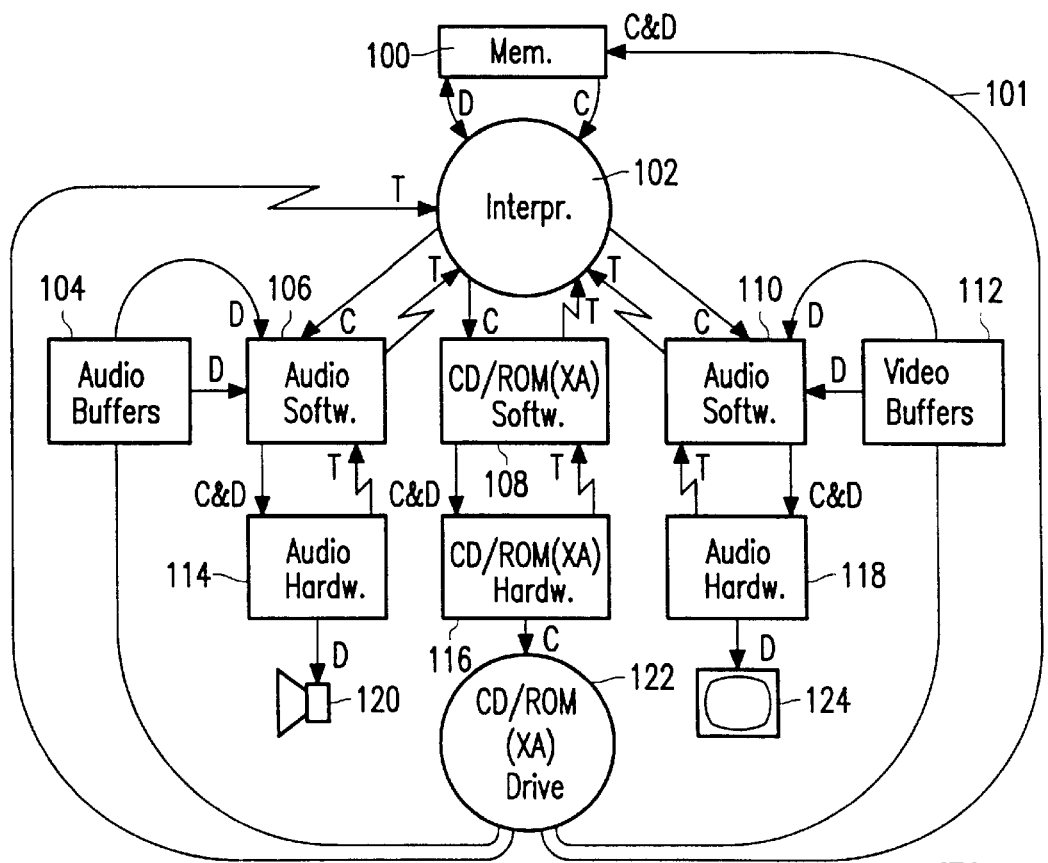
FIG. 4 shows a CPF runtime system.

FIG. 4 shows a CPF runtime system, which in fact is an execution model to process application programs according to the invention and conform the CPF format, inclusive of interactions on audio, video, and control level. As indicated, the control channels carry control signals C, data channels carry data signals D, and timing channels carry timing signals T. The central command and data memories box 100 represents the application program, that directly interacts with interpreter program 102, the latter being also presented to the platform as part of the same title as the application program itself. The external C&D inputs 101 entering box 100 represent CPF scripting language constructs with associated parameters representing amongst others the multimedia assets that originate from lower level platform hardware, as a result from commands issued by the interpreter to that lower level hardware. The shaded central part of the Figure represents the platform-dependent part of the system, whereas the outer blocks represent the platform independent part of the system. Notably, the Figure comprises a CD/ROM(XA) software block 108, a CD/ROM(XA) hardware block 116, a CD/ROM(XA) drive 122, audio software 106, audio hardware 114, audio buffers 104, and audio output structures 120, video software 110, video hardware 118, video buffers 112, and video output structures 124. For clarity, user control actions have not been shown in this Figure. In particular, the audio and video data streams do not pass through the box 100, because this would cause overhead and associated slower operating. In the non-real-time operating mode, a title has audio, video and control files, and the control file contains sufficient information to know which of the files to transport to other devices. On the other hand, in a real-time operating mode, there is a real-time file that contains interleaved parcels of audio, video, and control. The handler in the interpreter takes care of the selecting among those parcels for transferring to the intended locations, and at the same time assigning the correct audio and video related functions to those parcels. The timing information shown in the Figure can synchronize the various operations depending on the functionality levels of the underlying hardware.

PLATFORM INDEPENDENT FORTH DICTIONARIES

Figure 5:
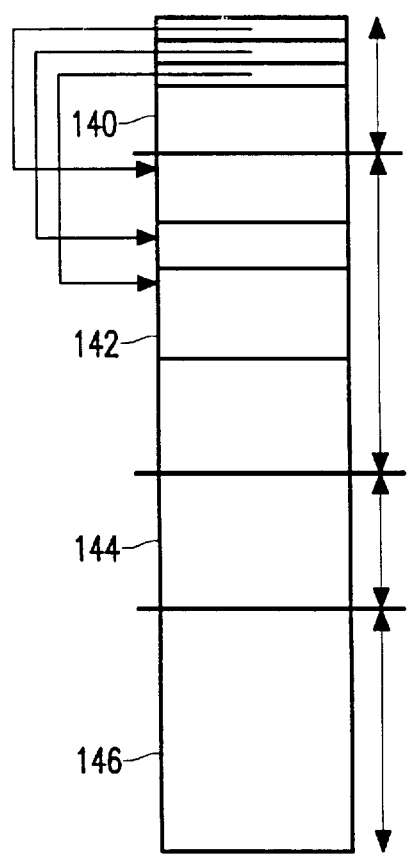
FIG. 5 shows a memory layout for a FORTH interpreter.

Hereinafter, a set of interpreters for the well-documented FORTH language (cf. various textbooks on programming languages) is described, on the basis of their mapping from input to output. For brevity, the Forth language itself is not expressly considered. The interpreters interpret the instructions, fetch assets called for therein, and invoke associated items from the library. For each different platform, the same source file set of instructions is present, that may result in the rendering of the assets. In principle, at least two such interpreters are necessary, generally one for a PC under the operating system DOS/Windows 3.1, and one for the CDI-player under CD-RTOS. Another real platform could be an Apple Macintosh machine. FIG. 5 shows a memory layout for such FORTH interpreter. Its operation will be described hereinafter. The memory layout is shown as a column of memory locations. With respect to the memory map of FIG. 5, the interpreter is assumed to be indirectly threaded. This latter property means that first an indirection or dispatch table must be accessed that provides points to the directly threaded code available in the dictionary; then, interpretation may start immediately. In the memory, part 140 contains a table of Callable Forth Addresses or cfa's of machine (platform) dependent primitives (A) or elementary operations feasible for execution on the machine in question. Part A is a dispatch table that during loading provides the binding through the indirect addressing feature between the definitions in parts C+D and the machine dependent instructions in part B. Referrals in Parts C+D use this table in part A to find the relevant machine dependent instructions in part B. Each element of part 140 points to its own segment of memory part 142, that contains the implementations of the various machine dependent primitives (B). This is the heart of the interpreter and contains all CODE (executable assembly code) and ;CODE (Forth interpretable code), the interpreter for the address, and the initialization code. This table is used when loading the machine-independent part of the title and also when, during creating of the title, saving (storing) this part of the dictionary. Together, parts A and B represent the machine-dependent part of a title. A relatively minimal realization of a title therefore contains two versions of both parts A and B, to constitute a multiplatform title for at least two different hardware platforms. Parts C and D contain the machine-independent code of the title. Herein, part C contains the title-independent and machine-independent code that is present in every title. Part D contains the title-dependent code, and will be generated as part of the total building process when the title-dependent code is produced.

When saving the dictionary, parts A+B are stored together in a first single file, one version for each different platform that must be supported. Parts C+D are then stored in a second single file. It is this mechanism that allows to execute the title on various different platforms, through having a common part of platform-independent instructions and multiple sections of platform-dependent instructions, one section for each platform, and a binding mechanism as discussed. This is described hereinafter in more detail.

The storage organization of parts C+D allows loading on a different platform, and to link all cfa's in part C+D to the currently selected platform variant of part B, provided that the entries in part A match with the dispatch table on the platform where parts C+D had been stored. Note that during playback of a title part A is no longer effective, as its binding effect has made it superfluous. A small disadvantage is that the FORTH interpreter can no longer be directly threaded: no longer does every dictionary entry contain a machine instruction. Also, loading and relocating become slightly more complex.

This mechanism of indirect threading is also used to make the contents of parts C and D independent from the platform operating system. This is effected by generalizing the system calls used by the interpreter (e.g. for file I/O and for solving the byte swap problems that may occur), and applying the same mechanism of indirect calls of the machine-dependent code. System calls in kernel part B are invoked via the dispatch table in part A from the machine independent code in parts extended kernel parts C+D.

The execution makes use of on the following three functions:

forth_loader( ), this function is called with the names of the kernel B and extension kernel C+D. Table A is used to bind the system dependent kernel functions into the extension kernel.

load_context( ), this function is called with the name of the appropriate root context. The root context is the starting section of the application and will invoke, after initialisation operations, other contexts with subsequent load_context( ) calls.

forth_execute( ), this function starts the actual interpretation process and has as parameter the address of the first token in the root context. The function can return two values. A returned zero signals that not all FORTH words in the context content have been interpreted, but that (instead) the FORTH instruction word 'sleep' has been executed. The execution of this Forth word saves the execution state in the user area, and returns to the caller of the forth_execute( ) function. The thread may be restarted by calling the function forth_execute( ) once more with the same parameters. Only when the entire content of the context has been interpreted, the function forth_execute( ) will return a non-zero value. Thereupon, the areas used as stack, return stack, and user area, are relinquished and may be used for other purposes again.

DESCRIPTION OF A PROGRAM EMBODIMENT

The appendices give various exemplary program modules, to illustrate how the common publishing format is effectively used, and to enable a skilled art person to practice the invention. The example is a short part of a multimedia application, of which the development through the process is described to realize the actual playback at an end user platform.

The application to be displayed is the following: first, starting from a dark screen, a picture defined in a standard dyuv colour format is brought up by means of the video effect wipeClock. Therein, starting in a predefined origin point, a sweeping line is rotated, while the field effectively displayed is given by the area having been covered by the sweep. Next, the application waits until the user moves the cursor into a certain area of the field, the hotspot, and pushes on the pointing mechanism, such as a mouse, the right action button down (button1Down). If this has occurred, the application proceeds by changing the display from the actual picture to another picture that is coded in a different standard format (clut7 format) via another video effect (wipeBT, wherein the wiping motion is a straight line moving from bottom to top in the picture). The resulting picture is shown during a prespecified time interval as controlled by a timer. Subsequently, the application terminates.

The complete application is programmed in the authoring language called CPF-Talk. In this language, that may be used to express the output from a graphical design tool, the output that forms the application is divided into so-called contexts, each of which may exhibit its own specific behaviour. The various contexts are interconnected through so-called actions that transfer the control from one context to another context. In the application described, three different contexts are distinguished. The start_context relates to the showing of the first picture, the next_context to the showing of the next picture, the stop_context relates to the termination of the application. The control transfers from start_context to next_context upon the user pushing the action button when located at the hotspot. The control transfers from the next_context to the stop_context under control of the timer output signal, the timer having started at the preceding control transfer to the next_context.

Additional to these three contexts is a common root_context that defines various global objects that are needed by the other three contexts. The root_context is the first to be called when the application is started; when all instructions of the root_context have been executed, it passes control automatically to the first non-root context, in this case the start_context. Tables 1–4 give the contents of these four contexts for the application as described. In Table 1, first the root_context is listed, together with two variables, one a time interval and one an effect quantity. Furthermore, two colour palettes are defined (they could have been different) and two surfaces. The surfaces are defined on a plane, get their colour coding defined, the pixel size, the start colour, and the colour after fade, if applicable. Finally, the root_context specifies what is to be done next.

In Table 2, the start_context first specifies where to access the initial image, next a cursor shape, the hotspot location, and the action what is to be done when the button at the hotspot location was actuated at least during the prespecified interval dur50. Finally, the operations are specified that must be executed when entering this context. In Table 3, the structure of the next_context is comparable. A particular feature is the specification of the timer. In Table 4, the stop_context is self-evident.

The next step in the process towards the actual playback at the end user platform is the translation of these four contexts into the Forth language. The result is also called the CPF Script format. The translation results are specified in Appendices 5–8. The vocabulary has increased because more words are available than allowed in the standard Forth dictionary; this extending will be explained later on. The correspondence between the matter present in Tables 1–4, and in Tables 5–8 respectively, is self-evident.

The representation according to Tables 5–8 is in the language and format that the interpreter uses during the building of the application. During the actual playback on the user platform, a more efficient format is used. This compact format is the internal representation of a context in the interpreter after parsing and address resolving operations have been executed on a context that was expressed in CPF Script format. This compact format is called the binary modules format. Therein, for instance, symbolic references are replaced by actual address offsets in a dictionary. These binary modules are in a non-human readable format and in consequence have been omitted from the Appendices for clarity. These binary modules, the assets they are referring to and all necessary standard support functions are then put on a mass memory which completes the building process.

Hereinafter, the operation of the interpreter at runtime is illustrated. The interpreter consists of three parts. The first part or kernel is the same for all platforms and for all titles. The second part, often called extension kernel, is application dependent, but for a particular application identical for all platforms. Both kernel and extension kernel make use of and refer to a third part that contains the platform dependent functions. These functions in encoded form need not have the same physical lengths, and therefore the offset values in the dictionaries may vary from platform to platform. For solving the problem caused thereby, only during loading a fourth component is added to the interpreter, which contains the offsets for the platform dependent functions in the dictionary for the actual platform where the execution is to be effected. When loading, referrals from kernel and extension kernel to the platform dependent dictionary are replaced by referrals taken from this table.

To illustrate the above part of the interpretation process, the instruction 'copy START_image to surface1' will be described in detail. First, it is understood that for the reading, the format is as already shown according to Tables 5–8. The interpreter kernel gets the instruction according to:

'START_image~surface1~0 0 0 copy-obj' and invokes the module copy_obj from the extension kernel with all associated arguments (0 0 0 surface1~and START_image~) on the stack. Herein, the tilde indicates a variable. In the present case, the extension kernel needs only two of the arguments, namely the objects surface1~and START_image. The extension kernel must have memory space to copy the picture into, and for that purpose invokes a program module for requesting this memory from the operating system. At this stage an operating system dependent system call will be invoked which during loading of the interpreter was linked to the extension kernel as described above. After reservation of the memory, further operating system dependent modules are invoked to open the file on the mass memory, to copy the content of the file into the reserved memory space, and to close the file on the mass memory. The latter system calls have been linked to the extension kernel in the same manner as described for the memory handler.

In this way an instruction, that is present in a context, like 'copy START_image to surface1' may for each different platform subsystem result in the invocation of a respective different functionality for e.g. memory handling and file I/O, as well as for many other platform dependent functionalities. Other instructions may in similar way result in such different functionalities.

TABLE 1

```
context root
context START_context in "START.cxt"
context next_context in "next.cxt"
context stop_context in "stop.cxt"
    variable dur = 50
    variable effect = 17
    palette palette1
        size: 128
        offset: 0
    end palette
    palette palette2
        size: 128
        offset: 0
    end palette
    surface surface1
        plane: A
        coding: clut7
        size: 768, 560
        color: 0
        fadeLevel: 0
    end surface
    surface surface2
        plane: B
        coding: clut7
        size: 768, 560
        color: 0
    end surface
```

TABLE 1-continued

```
    on entry
        change context to START_context
    end on
end context
```

TABLE 2

```
context START_context
    image START_image
        source: "/h0/STRUCTED/VIDEO/DYUV.d"
    end image
    cursor cursor0
        color: 0, 255, 255
        pattern: 0x7FFE,0xD557,0xAAAF,0x9FFD,\
                0x900D,0x900B,0x900B,0x900D,\
                0x900D,0x900B,0x900B,0x900D,\
                0x9FFD,0xA227,0xC88B,0x7FFE
    end cursor
    hotspot START0_hs
        location: 329, 233
        size: 102, 90
        on button1Down
            dur = 50
            change context to next_context
        end on
    end hotspot
    on entry
        show cursor
        set coding of surface1 to dyuv
        copy START_image to surface1
        attach START0_hs to surface1
        attach cursor0 to START0_hs
        surface order surface2, surface1
        display pal
        wipeClock dur surface2 to surface1
        cursorPosition 384, 280
    end on
end context
```

TABLE 3

```
context next_context
    image next_image
        source: "/h0/STRUCTED/VIDEO/CLUT7.cl7"
    end image
    timer next0_timer
        interval: 100
        count: 0
        on count 1
            effect = 6
            dur = 50
            change context to stop_context
        end on
    end timer
    on entry
        hide cursor
        set coding of surface2 to clut7
        copy next_image to surface2, palette2
        attach palette2 to surface2
        surface order surface1, surface2
        display pal
        wipeBT dur surface1 to surface2
        cursorPosition 384, 280
        start next0_timer
    end on
end context
```

TABLE 4 context stop_context
   on entry
      exit
   end on
end context

TABLE 5

""/users/user/home_directory pc-setenv
root-ctxt
context: START_context~ START.cxt
context: next_context~ next.cxt
context: stop_context~ stop.cxt
4 n 50 => dur~
4 n 17 => effect~
palette: palette1~
   128 palette-size!
   0 palette-offset!
palette;
palette: palette2~
   128 palette-size!
   0 palette-offset!
palette;
surface: surface1~
   plane-a plane!
   d-clut7 coding!
   768 560 surface-size!
   0 surface-color!
   0 fadelevel!
surface;
surface: surface2~
   plane-b plane!
   d-clut7 coding!
   768 560 surface-size!
   0 surface-color!
surface;
entry: on-entry
   START_context~ 2ctxt
entry;

TABLE 6 local-context: START_context~
   image: START_image~
   r" /h0/STRUCTED/VIDEO/DYUV.d" image-source!
image;
   cursor: cursor0~
   0 255 255 cursor-color!
   bitmap( 32766 54615 43695 40957 36877 36875 36875 36877 36877 36875
   36875 36877 40957 41511 51339 32766 ) pattern!
cursor;
   hotspot: START0_hs~
   329 233 hotspot-location!
   102 90 hotspot-size!
   [[ ev-b0d ]]event: 'z1
      n 50 dur~ v!
      next_context~ 2ctxt
   event;
hotspot;
   entry: on-entry
   show-cursor
   d-dyuv surface1~ coding!
   START_image~ surface1~ 0 0 0 copy-obj
   START0_hs~ surface1~ attach-obj
   cursor0~ START0_hs~ attach-obj
   0 surface2~ surface1~ surf-order
   display_625 display
   dur~ vn@ time-check surface2~ surface1~ $wait wipe-clock
   384 280 cursor-position
entry;

TABLE 7 local-context: next_context~
   image: next_image~
   r" /h0/STRUCTED/VIDEO/CLUT7.cl7" image-source!
image;
   timer: next0_timer~
   100 interval!
   0 count!
   [[ 1 ]]count: 'h1
      n 6 effect~ v!
      n 50 dur~ v!
      stop_context~ 2ctxt
   count;
timer;
   entry: on-entry
   hide-cursor
   d-clut7 surface2~ coding!
   next_image~ surface2~ palette2~ 0 0 copy-obj
   palette2~ surface2~ attach-obj
   0 surface1~ surface2~ surf-order
   display_625 display
   dur~ vn@ time-check surface1~ surface2~ $wait wipe-bt
   384 280 cursor-position
   next0_timer~ start-obj
entry;

TABLE 8 local-context: stop_context~
   entry: on-entry
      cdiforth-exit
   entry;

I claim:

1. Multimedia system receptive for mass data presentation thereto, said data comprising an application program inclusive of a multiplatform interpreter; said system furthermore having a platform subsystem,
being arranged for interaction with said multiplatform interpreter,
comprising processing means for executing said multiplatform interpreter driven by said application program and under control of user input means,
and furthermore having user output means controllable by said multiplatform interpreter,
characterized in that said application program is based on a predetermined instruction set that is interpreted by said processing means for said executing, whereby said platform subsystem is an instance of a prespecified abstract machine having said predetermined instruction set,
and a predetermined data type set, and said subsystem furthermore comprising resource facilities according to predetermined quantitative minimum requirements.

2. A multimedia system as claimed in claim 1, and having physical interface means for receiving said mass data on a unitary memory medium.

3. A multimedia system as claimed in claim 1, and having physical attachment means for receiving said mass data via a remotely fed channel means.

4. A multimedia system as claimed in claims 1, 2 or 3, wherein said platform subsystem is any of a personal computer and a CD-I machine.

5. For use in a multimedia system receptive for mass data presentation thereto, said data comprising an application program inclusive of a multiplatform interpreter, said system furthermore having a platform subsystem, being arranged for interaction with said multiplatform interpreter, comprising processing means for executing said multiplatform interpreter driven by said application program and under control of user input means, and furthermore having user output means controllable by said multiplatform interpreter, wherein said application program is based on a predetermined instruction set that is interpreted by said processing means for said executing, whereby said platform subsystem is an instance of a prespecified abstract machine having said predetermined instruction set, and a predetermined data set, and said subsystem furthermore comprising resource facilities according to quantitative minimum requirements:
a self-contained mass memory comprising the multiplatform interpreter, and comprising:
a dispatch table comprising location addresses of platform dependent primitives,
a kernel area containing all locations addressable by said location addresses for storing executable and interpretable code, and
an extended kernel area, having a first area containing code that is both platform independent and title independent and a second area containing title dependent code.

6. For use in a multimedia system receptive for mass data presentation thereto, said data comprising an application program inclusive of a multiplatform interpreter, said system furthermore being capable of having a platform subsystem, being arranged for interaction with said multiplatform interpreter, comprising processing means for executing said multiplatform interpreter driven by said application program and under control of user input means, and furthermore having user output means controllable by said multiplatform interpreter, wherein said application program is based on a predetermined instruction set that is interpreted by said processing means for said executing, whereby said platform subsystem is an instance of a prespecified abstract machine having said predetermined instruction set, and a predetermined data set, and said subsystem furthermore comprising resource facilities according to quantitative minimum requirements, the system comprising a self-contained mass memory having the multiplatform interpreter, the memory comprising:
a dispatch table comprising location addresses of platform dependent primitives,
a kernel area containing all locations addressable by said location addresses for storing executable and interpretable code, and
an extended kernel area, having a first area containing code that is both platform independent and title independent and a second area containing title dependent code:
the platform subsystem having load means for loading said multiplatform interpreter.

7. A self-contained mass memory, comprising a multimedia title and furthermore a multiplatform interpreter for rendering said title executable on each of a set of different predetermined species of platform subsystems, said interpreter comprising for each one such species a respective different version of associated species information, to wit:
a dispatch table (A) comprising location addresses of platform dependent primitives;
a kernel area (B) containing all locations addressable by said location addresses for storing executable and interpretable code,
and said title comprising for all said species combined a uniform information in an extended kernel area (C+D), having a first area (C) containing code that is both platform independent and title independent, and a second area (D) containing title dependent code.

8. A self-contained mass memory as claimed in claim 7, wherein the above set consists of only two different species.

9. A self-contained mass memory as claimed in claim 7, wherein said title comprises a limited fraction of its multimedia data in each of a plurality of respective platform-specific formats.

10. A self-contained mass memory as claimed in claim 9, wherein at least one such platform-specific format allows some real-time conversion by a non-conforming delivery platform subsystem.

11. A self-contained mass memory as claimed in claim 7, wherein such interpreter for its associated platform type is arranged for interpreting title instructions, for fetching assets called therein, and for invoking associated items from a platform library.

12. A self-contained mass memory as claimed in claim 11, wherein such interpreter is indirectly threaded.

13. A self-contained mass memory comprising an application program, and furthermore a multiplatform interpreter that is based on a predetermined instruction set, for presentation to a platform subsystem with data processing means, and in particular for controlling said data processing means first to execute said multiplatform interpreter as driven by said multiplatform interpreter and further under control by user input means, and second to control user output means by said multiplatform interpreter, during interpretation of said application program by said processing means for said executing, thereby rendering said platform subsystem an instance of a prespecified abstract machine having said predetermined instruction set, and a predetermined data type set, provided that said platform subsystem furthermore comprises resource facilities according to predetermined quantitative minimum requirements.

14. A mass data memory as claimed in claim 7, being operative for the following three functions:
forth_loader( ), which function is called with names of kernel B and extension kernel C+D, whereas table A is used to bind platform dependent kernel functions into the extension kernel;
load_context( ), which function is called with the name of an appropriate root context, that is a starting section of the title, for subsequent to initializing operations, invoking other contexts with subsequent load_context calls;
forth_execute( ) that starts actual interpretation process and has as parameter the first token in the root context.

15. A platform subsystem arranged for inclusion in a multimedia system and being receptive for mass data presentation thereto, which data comprise an application program inclusive of a multiplatform interpreter, said platform subsystem having processing means for executing said multiplatform interpreter driven by said application program and under control of user input means, and having user output means controllable by said multiplatform interpreter, wherein said application program is based on a predetermined instruction set that is interpreted by said processing means for said executing, and said platform subsystem is an instance of a prespecified abstract machine having the instruction set present in said title and a predetermined data type set, and said processing means being arranged for executing said title after interpretation thereof.

16. For use in a multimedia system receptive for mass data presentation thereto, said data comprising an application program inclusive of a multiplatform interpreter, said system furthermore being capable of having a platform subsystem, being arranged for interaction with said multiplatform interpreter, comprising processing means for executing said multiplatform interpreter driven by said application program and under control of user input means, and furthermore having user output means controllable by said multiplatform interpreter, wherein said application program is based on a predetermined instruction set that is interpreted by said processing means for said executing, whereby said platform subsystem is an instance of a pre-specified abstract machine having said predetermined instruction set, and a predetermined data set, and said subsystem furthermore comprising resource facilities according to quantitative minimum requirements;

and for interaction with a self-contained mass memory comprising the multiplatform interpreter, and comprising:

a dispatch table comprising location addresses of platform dependent primitives, a kernel area containing all locations addressable by said location addresses for storing executable and interpretable code, and an extended kernel area, having a first area containing code that is both platform independent and title independent and a second area containing title dependent code:

the platform subsystem having load means for loading said multiplatform interpreter.

* * * * *

UNITED STATES PATENT AND TRADEMARK OFFICE
CERTIFICATE OF CORRECTION

PATENT NO.    : 5,854,927
DATED         : December 29, 1998
INVENTOR(S)   : Johan H.A. Gelissen It is certified that error appears in the above-identified patent and that said Letters Patent is hereby corrected as shown below:

<u>Title page,</u>
Item [54], Title, after "INTERPRETER" insert -- , --; change "SYSTEMS" to -- SYSTEM --; and after "SYSTEM" insert -- OR SUBSYSTEM --.

Signed and Sealed this

Twelfth Day of November, 2002

Attest:

Attesting Officer

JAMES E. ROGAN
*Director of the United States Patent and Trademark Office*